No. 869,300. PATENTED OCT. 29, 1907.
R. FLEMING.
ARC LAMP ELECTRODE.
APPLICATION FILED NOV. 22, 1902.

Witnesses.

Inventor.
Richard Fleming,
by
Atty.

UNITED STATES PATENT OFFICE.

RICHARD FLEMING, OF LYNN, MASSACHUSETTS, ASSIGNOR TO GENERAL ELECTRIC COMPANY, A CORPORATION OF NEW YORK.

ARC-LAMP ELECTRODE.

No. 869,300.   Specification of Letters Patent.   Patented Oct. 29, 1907.

Application filed November 22, 1902. Serial No. 132,438.

*To all whom it may concern:*

Be it known that I, RICHARD FLEMING, a citizen of the United States, residing at Lynn, county of Essex, State of Massachusetts, have invented certain new and useful Improvements in Arc-Lamp Electrodes, of which the following is a specification.

I have found that an electrode possessing many advantages both from the standpoint of luminosity and mechanical strength can be made by filling an iron tube with iron in a divided state, such as iron filings, cast iron chips or the like. Suitable means are provided for retaining the finely divided iron in the tube. The means for retaining such material at the arc end may take the form of some metal object by means of which the proper degree of conductivity is given to that end of the electrode to start the arc. In operation this end of the electrode is soon formed into a fused mass containing the various oxids of iron as well as fused iron. This fused end is sufficiently conductive so that if the operation of the lamp be stopped after it is once formed, the arc will readily form again. The electrode described possesses very valuable luminous qualities and is cheap and strong in construction.

Figure 1:
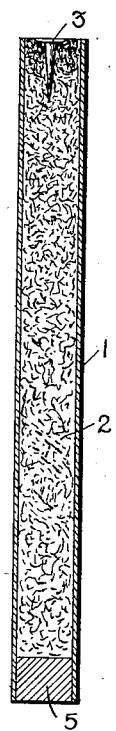
Figure 2:
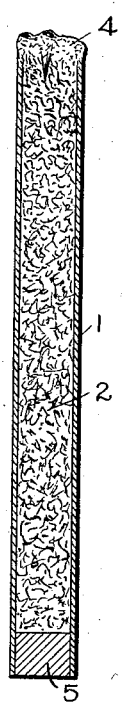

For a better understanding of my invention, reference may be had to the accompanying drawings in which Figure 1 shows in sectional elevation an electrode formed in accordance with my invention; Fig. 2 is a similar view showing the electrode after it has been used.

In the drawing 1 represents a tube which may be a section of iron pipe and 2 represents the filling of divided iron such as iron filings, cast iron chips or the like.

In Fig. 1 I have shown a common iron or other metal tack 3, such as a carpet tack, as embedded in the arc end of the electrode. The tack when so embedded tends to compact and retain the finely divided particles of iron at that end. In place of using tacks of course other constructions could be employed; for instance, a piece of wire netting might be inserted in the tube at that point, or the end of the tube might even be wholly or partially closed in order to retain the iron filings at that point and to form a good conducting end by means of which the arc could readily be started when the electrode is first put in service.

At 4 in Fig. 2 I have indicated the appearance of the arc end of the electrode after the electrode has been put in service. The end is soon formed into a mass of fused material which includes in its composition probably the various oxids of iron along with some free iron and unmixed with any deleterious substance. Any suitable retaining device can be employed at the other end of the tube to hold the finely divided iron in place. As one means for accomplishing this result, iron plugs 5 may be driven into that end of the pipe. The electrode thus formed possesses considerable mechanical advantages. It is easily and cheaply made and is practically unbreakable. It possesses excellent qualities as an electrode for a luminous arc as it is but slowly consumed in operation and the arc given thereby is of the flaming or luminous type and possesses high illuminating powers. By my use of the term "iron" I intend to include steel and the like.

The use of some metallic body centrally located in the electrode as shown in the drawings is especially advantageous, for with it in the initial operation of the electrode the arc is struck from the center of the electrode and the iron is fused uniformly about the center. With this construction the tendency of the arc to play about the edge of the tube is done away with. Ordinarily the electrodes have their ends fused over before shipment from the factory at which they are made.

While I have shown the best form of electrode embodying my invention now known to me, I do not intend to be limited to the exact details of construction shown, as they may be varied somewhat without departing from my invention.

What I claim as new and desire to secure by Letters Patent of the United States, is,

1. An arc lamp electrode consisting of an iron tube filled with iron particles.

2. An arc lamp electrode consisting of an iron tube filled with iron in a finely divided state.

3. An arc lamp electrode consisting of an iron tube filled with iron particles having an iron tack embedded in said particles at one end of the tube.

4. An arc lamp electrode consisting of an iron tube filled with small iron particles and having a large piece of iron embedded in the particles at one end of the tube.

5. An arc lamp electrode consisting of an iron tube filled with iron particles and having a retaining metallic piece inserted in said particles at one end of the tube.

6. An arc lamp electrode consisting of an iron tube filled with particles of iron and having means provided at one end of the tube for retaining the iron particles in the tube and increasing the conductivity of the electrode at that point.

7. An arc lamp electrode consisting of an iron tube filled with particles of iron and provided with means for initially increasing the conductivity of the filled tube at its arcing end.

8. An arc lamp electrode consisting of an iron tube filled with finely divided particles of iron and provided with means at its arcing end for preventing the escape of the iron particles from the tube.

9. An arc lamp electrode consisting of a metal tube filled with iron particles.

10. An arc lamp electrode consisting of a metal tube filled with particles of the metal from which the tube is made.

11. An arc lamp electrode consisting of a metal tube filled with material in a finely divided form, and a metal retaining piece inserted in the tube at its arcing end to prevent the escape of the filling from the tube.

12. An arc lamp electrode consisting of a metal tube filled with metal in a finely divided form, and a metal retaining piece inserted in the tube at its arcing end to prevent the escape of the filling from the tube.

In witness whereof, I have hereunto set my hand this seventeenth day of November, 1902.

RICHARD FLEMING.

Witnesses:
DUGALD MCK. MCKILLOP,
JOHN A. MCMANUS.